United States Patent [19]

McCormack

[11] 3,790,910
[45] Feb. 5, 1974

[54] CONDITIONING CIRCUIT AND METHOD FOR VARIABLE FREQUENCY SENSOR

[75] Inventor: William H. McCormack, San Pedro, Calif.

[73] Assignee: The Garrett Corporation, Los Angeles, Calif.

[22] Filed: Apr. 21, 1972

[21] Appl. No.: 246,471

[52] U.S. Cl....... 235/151.3, 235/92 MT, 235/150.3, 235/150.53
[51] Int. Cl. ........................................... G06f 15/34
[58] Field of Search...... 235/92 MT, 92 FQ, 150.3, 235/150.53, 151.3, 151.34, 197; 73/393; 324/130; 331/44, 65, 66

[56] References Cited
UNITED STATES PATENTS

| | | | |
|---|---|---|---|
| 3,662,163 | 5/1972 | Miller et al. | 235/150.3 X |
| 3,700,865 | 10/1972 | Ley | 235/151.3 X |
| 3,472,077 | 10/1969 | Bucalo | 73/393 |
| 3,701,145 | 10/1972 | Bergin | 235/150.53 X |
| 3,655,956 | 4/1972 | Ley | 235/92 MT X |
| 3,482,084 | 12/1969 | Trusov et al. | 235/150.3 |
| 3,557,347 | 1/1971 | Robertson | 235/150.53 |

*Primary Examiner*—Malcolm A. Morrison
*Assistant Examiner*—Jerry Smith
*Attorney, Agent, or Firm*—Robert H. Fraser et al.

[57] ABSTRACT

A conditioning circuit includes a computer connected to a pressure transducer having a variable frequency oscillator the output signal of which varies with pressure, a temperature sensor, a read only memory storing constants which are dependent upon the particular transducer and application, and a counter connected to count the variable frequency output signal when gated. In accordance with the disclosed method, the computer obtains a digital count signal indicative of oscillator frequency by gating the output signal to the counter for a predetermined interval, converts an analog signal from the temperature sensor to a digital signal, and then computes a linearized, temperature compensated digital pressure signal in accordance with a predetermined function which utilizes constants stored in the read only memory to initially scale and translate the count signal for maximum computer accuracy, corrects for nonlinearities in the count signal, and corrects for variations in the count signal with temperature. The computed signal then appears at the output as a binary digital word accurately representing sensed pressure over a wide range.

19 Claims, 2 Drawing Figures

3,790,910

CONDITIONING CIRCUIT AND METHOD FOR VARIABLE FREQUENCY SENSOR

BACKGROUND OF THE INVENTION

1. Field of the Invention

This invention relates to devices and methods for sensing and indicating a physical condition and more particularly to a conditioning circuit and method for a variable frequency pressure sensor.

2. History of the Prior Art

Variable frequency pressure transducers are presently known which may be operated in conjunction with a computer to provide a linearized digital signal indicative of pressure. Such systems generally operate by measuring the time necessary to count a predetermined number of cycles of the variable frequency signal and converting this time period to a digital signal which varies linearly with oscillator frequency. The digital signal can then be operated on by the digital computer to provide a digital output signal varying linearly with pressure.

The arrangements described above require a different computer program for each type of transducer used and for each different application. In addition, relatively large counters must be employed in order to attain reasonable accuracy at moderate to high oscillator frequencies.

SUMMARY OF THE INVENTION

A conditioning circuit and method in accordance with the invention provides an accurate, temperature compensated digital output signal which varies linearly with a physical condition over a wide range of changes in the physical condition. In this example, a digital computer is connected to a variable frequency pressure transducer having an oscillator whose output varies with a sensed pressure, a temperature indicator, a read only memory storing constants which relate to the particular characteristics of the transducer, and a counter and associated register for obtaining a digital signal indicative of oscillator frequency. Containment of these elements within the transducer itself permits interchangeability of transducers without need for change of the program or data storage for the computer.

The method of providing the accurate, temperature compensated digital output signal includes the steps of converting the variable frequency oscillator output signal to a rationalized digital signal $C_{P,T}$ which increases monotonically with oscillator frequency and has a predetermined value at a reference frequency, converting the analog temperature indicative signal to a digital signal $K_T$ which is representative of transducer temperature, computing a linearized temperature compensated digital pressure signal P which varies linearly with pressure in accordance with a predetermined mathematical function dependent upon $C_{P,T}$, $K_T$ and the constants stored in the read only memory, and providing the digital signal P as an output.

The step of converting the oscillator output into the digital signal $C_{P,T}$ includes the substeps of gating the oscillator output to the counter for a predetermined period of time, counting cycles of the oscillator output throughout the gating period, subsequently transferring the count obtained to a register, transferring the count stored in the register to the computer, and then scaling and translating the count in accordance with constants stored in the read only memory to obtain a rationalized digital count signal $C_{P,T}$ which is scaled and zero translated to a standardized relationship making optimum use of computer accuracy. An analog-to-digital converter internal to the computer provides the digital signal $K_T$ in response to the sensed temperature.

BRIEF DESCRIPTION OF THE DRAWINGS

A better understanding of the invention may be had from a consideration of the following detailed description taken in conjunction with the accompanying drawing in which.

DETAILED DESCRIPTION

A conditioning circuit for a variable frequency sensor in accordance with the invention responds to a physical condition being sensed by providing a temperature compensated digital signal which varies with the sensed condition. Although pressure is sensed in this example, the technique is equally applicable to distance, temperature or other physical conditions.

Figure 1:
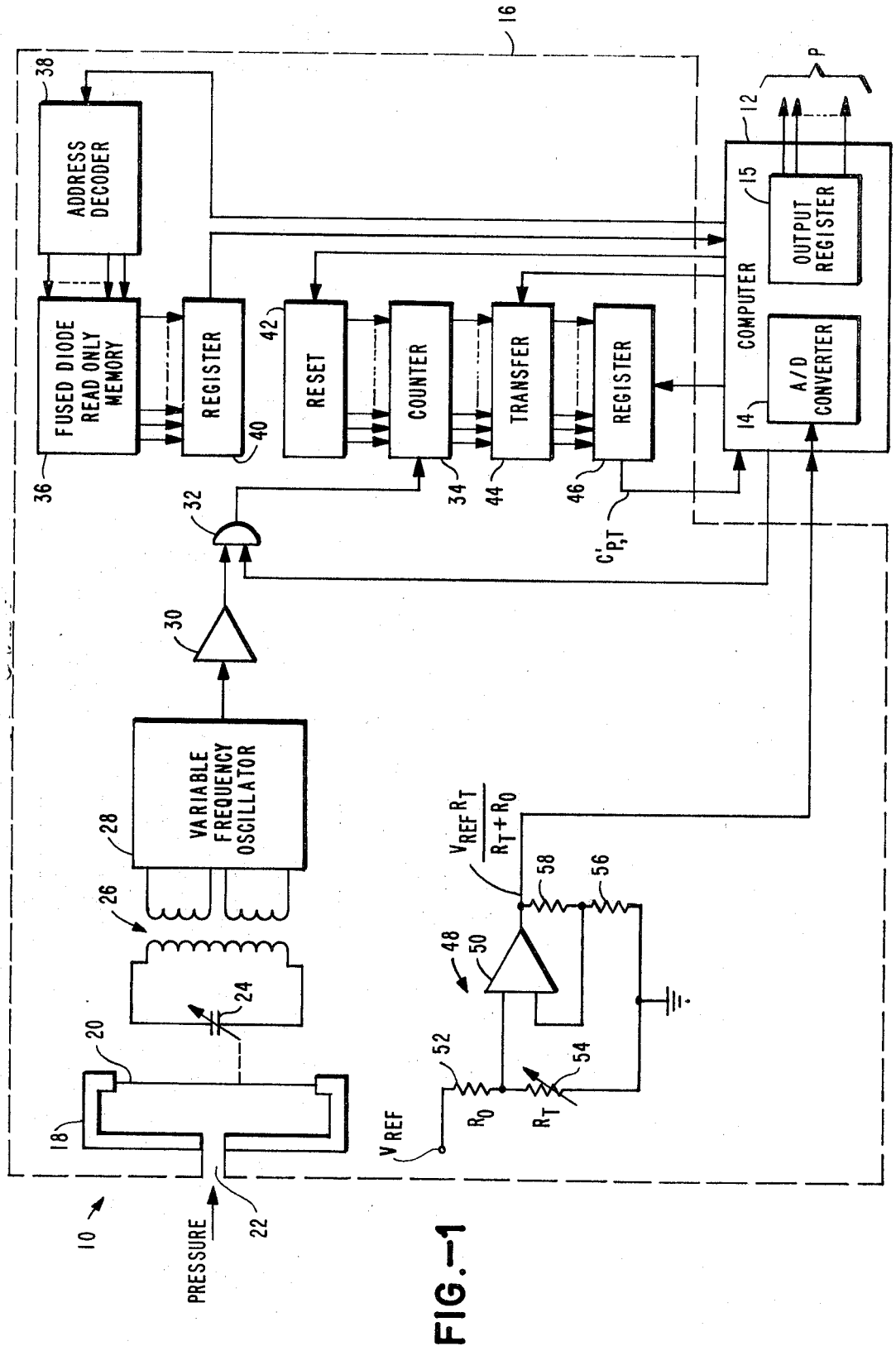
FIG. 1 is a combined block diagram and schematic representation of a conditioning circuit for a variable frequency sensor in accordance with the invention.

As shown in FIG. 1, to which reference is now made, a conditioning circuit 10 includes a digital computer 12 having an internal analog to digital (A/D) converter 14 and an output register 15. The computer 12, which is operably connected to a pressure transducer package 16, is a fixed point fractional notation two's complement computer operating with 20 bit words (19 bits plus one sign bit).

Contained within the transducer package 16 is equipment for providing a digital signal indicative of pressure, for providing analog signals indicating transducer temperature, and for storing digital constants which are determined in accordance with particular characteristics and intended applications of the sensor. Among the stored constants are slope and offset constants for transforming an original count to a rationalized count which varies monotonically with sensed pressure over substantially the full range of a word length. Because this equipment and information is self contained in each sensor 16, interchangeability of sensors can be accomplished without need to change the programming or stored information for the computer 12.

Contained within the transducer package 16 is a cylinder 18 having a diaphragm 20 and a port 22 which provides communication between the diaphragm 20 and a manifolded fluid pressure which is being sensed. The diaphragm 20 is mechanically coupled to control the value of a variable capacitor 24 which is connected across the terminals of one winding of a transformer 26 which has a fixed inductance and which has additional windings coupled to control the frequency of a variable frequency oscillator 28 in accordance with the value of the capacitor 24. The variable frequency output signal from the oscillator 28 is buffered by an amplifier 30 and gated through one input of an AND gate 32 to a counter 34.

The computer 12 is connected to a second input of the AND gate 32 and provides an accurate window for gating the buffered oscillator output to the counter 34 for a fixed period of time determined by a count down from a fixed frequency computer clock (not shown, but a part of a conventional computer of the type here involved).

The counter 34 acts as a frequency detector because the accumulated count, $C_{P,T}'$, is proportional to the frequency of the output signal from the oscillator 28. Furthermore, as long as no two frequencies produce the same count in the counter 34 over the range of pressures being sensed, the counter can overflow one or more times without ambiguity or loss of accuracy. Thus, there is no need to vary the time span of the window to accommodate different center frequencies for the oscillator 28 or ranges of pressures being sensed. Constants stored within a read only memory 36 within the transducer 16 can provide proper constants for translating and scaling the accumulated count $C_{P,T}'$ to a rationalized count $C_{P,T}$ conforming to standardized criteria utilizing a predetermined zero point and scale factor. The computer 12 can thus operate in conjunction with different transducers operating in a variety of situations without need for separate programming for each transducer. In the present example, the transducer 16 may operate over a pressure range of zero to 36.000 in. Hg. The oscillator 28 must have a maximum operating frequency not greater than the counter input capability and the frequency variation may be as large as the counter (maximum count) divided by the window time span. Thus, with a 20-bit counter with a 0.042 second window working in conjunction with a 19 bit plus sign bit computer, the frequency range limit is 25 M Hz. This means that the range of frequencies generated in response to the sensed conditions (zero to 36 in. Hg. pressure in this example) may be 0 to 25 M Hz, 50 to 75 M Hz or any similar range in between having a delta no larger than 25 M Hz. A sensor having only a 2.5 M Hz swing is of course accommodateable.

The read only memory 36 includes an address decoder 38 which is connected to respond to an address supplied by the computer 12 and a register 40 which is connected to communicate the contents of addressed locations back to the computer 12. In addition to the scaling and translating constants for the original frequency count, the read only memory 36 stores other constants which are particularly related to the specific characteristics and application of the transducer 16.

The computer 12 obtains the accumulated count $C_{P,T}'$ by first activating a reset portion 42 of the counter 34, then enabling AND gate 32 to provide the window during which the counter 34 counts successive cycles of the output signal from oscillator 28, and then activating a transfer portion 44 of the counter 34 to transfer (in parallel) the accumulated count $C_{P,T}'$ to a register 46. The accumulated count $C_{P,T}'$ is then transferred (serially in this example) to the computer 12 where it is operated upon digitally to obtain the final digital output signal P. It should be noted that since the counter may overflow one or more times during the time period of a gating window the accumulated count which is stored in the counter 34 at the termination of a window is probably not the same as the total number of cycles of the output signal generated during the gating period.

The computer 12 obtains a nonlinearized digital temperature signal $K_T$ by conversion of an analog output signal from a temperature indicator 48 to the digital signal $K_T$ with the internal analog-to-digital converter 14. The temperature indicator circuit 48 includes an amplifier 50 providing the analog temperature signal as an output, a resistor 52 having a resistance $R_O$, a temperature sensitive resistance 54 having a resistance $R_T$ and resistances 56 and 58 which control the gain of the amplifier 50. The amplifier analog output signal and converted digital signal $K_T$ are porportional to $R_T/(R_t+R_O)$ temperature indicator 48.

The final linearized and temperature compensated pressure signal P is output from the computer 12 as a 19 bit plus sign bit binary word X scaled such that binary word $X = 2^{19}$ when the pressure being sensed is 36.0 in. Hg. P can be converted to a decimal value $P_{10}$ in accordance with the function $P_{10} = (36.0)(X)/2^{19}$, where $P_{10}$ is in inches of Hg. P is computed in a generalized finite power series mathematical function, $$P = \sum_{j=0}^{m} f_j(K_T) f(C_{P,T})^j$$

$$P = f_0(K_T) + f_1(K_T) f(C_{P,T}) + f_2(K_T) f(C_{P,T})^2$$

In the above equations, $K_T$ is indicative of temperature, and $C_{P,T}$ is a rationalized slope and offset compensated signal representing the counted variable frequency signal in accordance with the function $C_{P,T} = (C_{P,T}'+C_C)/Z$, where $C_C$ and $Z$ are initial offset and slope constants which are stored in the read only memory 36. The letter $m$ is a positive integer and is equal to 2 in this example. As previously noted, various transducers 16 having a variety of center frequencies and different frequency ranges may be utilized without altering the program for the computer 12. This is possible because the transducer stored initial offset and scaling constants permit the computer 12 to compute a rationalized signal $C_{P,T}$ which always has a known value at a reference frequency. In this example $C_{P,T}$ has a value of 0 at the midpoint frequency of the range of variable frequencies and varies from approximately $-2^{19}$ to $+2^{19}$ over the zero to 36 in. Hg. of pressures being sensed regardless of the particular transducer which is being used. The scaling factor Z has additional importance in that it insures optimum use of the numerical range of the computer 12 to minimize roundoff errors for maximum accuracy.

Figure 2:
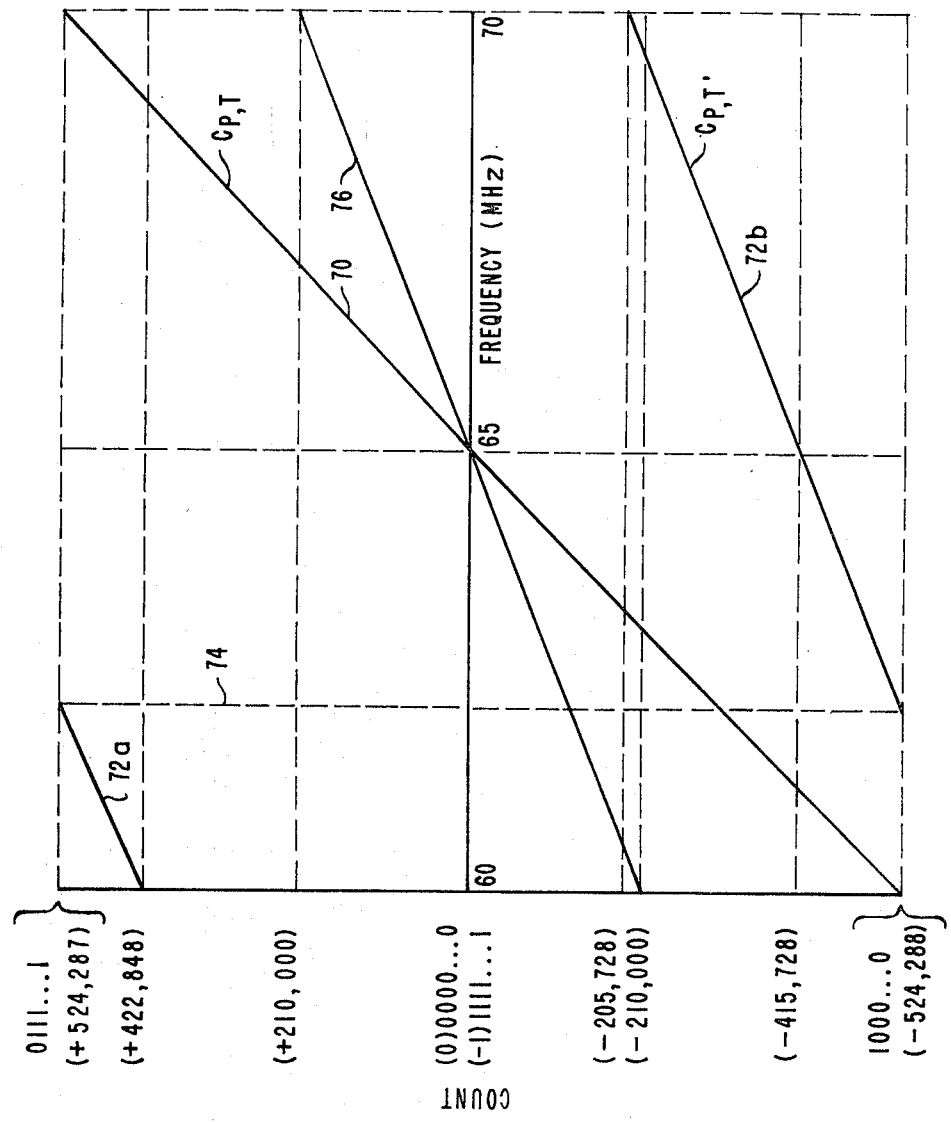
FIG. 2 is a graph illustrating the manner in which an original count signal is transformed into a rationalized count signal varying monotonically with frequency.

The manner in which the accumulated count signal $C_{P,T}'$ is converted to a rationalized count signal $C_{P,T}$ which varies monotonically with frequency is best explained in conjunction with FIG. 2 to which reference is now made. A graph is there shown with the frequency of oscillator 28 represented by the horizontal axis and the count represented by the vertical axis. Along the vertical axis decimal numbers are shown in parentheses and binary numbers are shown without parentheses. As an illustrative example it is assumed that a particular pressure sensor has a freuqency range of 60–70 M Hz over a range of temperatures and pressures to which it is subjected in a particular application.

In order to maximize computer accuracy and efficiency, it is desirable that the rationalized count $C_{P,T}$ extend from $-2^{19}$ (decimal $-524,288$) at the minimum frequency of 60 M Hz to $+2^{19}-1$ (decimal $+524,287$) at the maximum frequency of 70 M Hz and cross the zero point at the center frequency of 65 M Hz. Such a relationship is represented by line 70. This rationalized count $C_{P,T}$ varies linearly with output frequency and nonlinearly but monotonically with the sensed pressure.

However, the accumulated count signal $C_{P,T}'$ as represented by the discontinuous lines 72a and 72b differs significantly from the rationalized signal $C_{P,T}$ which is desired. It can be seen that for a gating window of 0.042 seconds the accumulated count function has a value of decimal +422,848 at the minimum frequency of 60 M Hz (the 20 bit counter having overflowed two times), has an interpretive discontinuity 74 between 60 and 65 M Hz (as the two's complement notation counter jumps from a maximum positive indication to a maximum negative indication) and has a value of decimal −415,728 at the center frequency. At the maximum frequency of 70 M Hz the accumulated count signal has a value of decimal −205,728.

The accumulated count $C_{P,T}'$ can be offset to a function represented by a line 76 wherein the count increases linearly and monotonically with frequency. In general, this can be done by determining the difference between the accumulated count 72a and the offset function 76 at frequencies below the discontinuity 74 and subtracting this difference from the accumulated count at such frequencies. Similarly, the difference between the two functions 72b and 76 can be predetermined and added to the accumulated count at frequencies above the discontinuity 74 to obtain the offset function 76 at the higher frequencies. Constants representing the two offset values and the original count ranges for which each is to be used can be stored in the memory 36 of transducer 16. A single program independent of the particular transducer can thus be used to transform an accumulated count signal $C_{P,T}'$ into a rationalized count signal $C_{P,T}$ and subsequently into a linearized, temperature compensated output signal P. It will be appreciated by one skilled in the art that adding a number is the equivalent of subtracting the negative of the number and the terminology add/subtract is used herein to indicate that either mathematical operation may be used alternatively.

By using a fixed point, fractional notation two's complement computer in conjunction with a counter having the same word length (e.g., 20 bits with the 20th or most significant bit of the counter aligned to correspond to the computer sign bit), this offset operation can be greatly simplified. Under these circumstances, a constant can be added/subtracted to the original count over the entire frequency range to obtain the offset function 76. In this example, the negative of the accumulated count at the center frequency ($C_C$ = 415,728) can be added. Any overflow which might occur within the computer is simply ignored and overflow into the sign bit is exactly what is required to make the sum conform to the offset compensated function 76. A single offset constant $C_C$ can thus be stored in the transducer mounted memory 36 under these circumstances.

The manner in which the offset constant operates to produce a monotonic function which passes through zero at the center frequency can be further explained by the following simplified example wherein both the counter and computer have a capacity of only 3 bits.

TABLE 1

| Frequency | Counter State | Fractional Notation Decimal Equivalent |
|---|---|---|
| Maximum | 1 1 1 | −0.25 |
| Center | 1 0 0 | −1.00 |
| Minimum | 0 0 1 | 0.25 |

The counter states are shown in Table 1 with the most significant or sign bit to the left. It can be readily observed that the accumulated count does not increase monotonically with frequency and that the count at the center frequency does not equal zero. However, by adding 1 0 0 (−1.00) to the accumulated count at each frequency while ignoring any overflow (shown to the left of the vertical lines) a function results which increases monotonically with frequency and passes through zero at the center frequency as shown below.

| Minimum frequency | Center frequency | Maximum frequency |
|---|---|---|
| 0 0 1 | 1 0 0 | 1 1 1 |
| 1 0 0 | 1 0 0 | 1 0 0 |
| 1 0 1 (−0.75) | 1 0 0 0 (0.00) | 1 0 1 1 (0.75) |

Having offset the original count to obtain the function 76, it is still necessary to adjust the scale or slope of the offset compensated function 76 to obtain the rationalized function $C_{P,T}$. This can be accomplished by dividing/multiplying the offset function 76 by a slope constant Z equal to the quotient (or the reciprocal of the quotient if multiplying) of the offset function 76 and rationalized function 70. One skilled in the art will recognize that dividing by a constant is equivalent to multiplying by the reciprocal of the constant and the terminology divide/multiply is therefore used herein to indicate that either mathematical operation may be used alternatively. In this example, at 60 M Hz the offset function 76 equals decimal −210,000, the rationalized function 70 equals decimal −524,288 and Z equals approximately decimal 0.40. The predetermined value of the slope constant Z is also stored in the transducer mounted memory 36.

The pressure dependent term $f(C_{P,T})$ of the general function is computed according to the finite power series equation $$f(C_{P,T}) = \sum_{i=0}^{6} a_i C_{P,T}^i,$$

where the seven $a_i$ terms are constants stored in the transducer mounted read only memory 36.

Similarly, the subfunctions $f_0, f_1$ and $f_2$ of the generalized function are also computed from finite power series as follows:

$$f_0(K_T) = \sum_{i=0}^{4} b_i K_T^i$$

$$f_1(K_T) = \sum_{i=0}^{4} c_i K_T^i$$

$$f_2(K_T) = \sum_{i=0}^{4} d_i K_T^i$$

where the 15 $b_i$, $c_i$ and $d_i$ constants are stored in the transducer mounted read only memory 36.

When these finite power series are combined into the generalized power series function, the result is $$P = \sum_{i=0}^{4} b_i K_T{}^i + \left(\sum_{i=0}^{4} c_i K_T{}^i\right)\left(\sum_{i=0}^{6} a_i C_{P,T}{}^i\right) + \left(\sum_{i=0}^{4} d_i K_T{}^i\right)\left(\sum_{i=0}^{6} a_i C_{P,T}{}^i\right)^2$$

Although there has been described above a specific conditioning circuit for a variable frequency sensor for the purpose of illustrating the manner in which the invention may be used to advantage, it should be appreciated that the invention is not limited thereto. Accordingly, all modifications, variations or equivalent arrangements which may occur to those skilled in the art should be considered to be within the scope of the invention.

What is claimed is:

1. Apparatus for indicating the status of a physical condition comprising a transducer interchangeably connected to a computer, the transducer sensing the physical condition and generating a first signal varying with the physical condition in response thereto, a transducer mounted memory storing scale and offset constants related to the particular characteristics of the transducer for rationalizing the first signal to a predetermined scale and zero point wherein the resulting rationalized function varies between predetermined values as the physical condition varies over a selected range regardless of the particular characteristics of the transducer, and a computer connected to rationalize the first signal by computing a rationalized second signal dependent upon the first signal, the scale constant and the offset constant in accordance with a predetermined mathematical function.

2. The invention as set forth in claim 1 above, wherein the sensed physical condition is pressure, the first signal is a digital signal, the transducer mounted memory is a digital read only memory and the computer is a digital computer.

3. The invention as set forth in claim 2 above, wherein the transducer includes a variable frequency oscillator connected to generate an output signal having a frequency varying with the magnitude of the sensed pressure and a counter connected to count successive cycles of the oscillator output signal, the first signal being the count stored in the counter at the end of a predetermined period of time.

4. The invention as set forth in claim 3 above, wherein the second signal varies monotonically with the sensed physical condition and wherein the counter may overflow during the predetermined period of time without loss of accuracy.

5. The invention as set forth in claim 3 above, wherein the second signal varies monotonically with the sensed physical condition and wherein the predetermined period of time is sufficiently long that the counter overflows at least once.

6. The invention as set forth in claim 1 above, further comprising transducer mounted temperature sensing means connected to provide the computer with a third signal indicative of transducer temperature and wherein the transducer mounted memory stores at least one constant in addition to the scale and offset constants for linearizing and temperature compensating the second signal in accordance with a second predetermined mathematical function dependent upon the second signal, the additional at least one constant and the third signal.

7. The invention as set forth in claim 6 above, wherein the second mathematical function has the form of a generalized finite power series $$\sum_{j=0}^{m} f_{ij} f^j,$$

where $f_j$ are power series dependent upon the third signal and $f$ is a power series dependent upon the second signal.

8. The invention as set forth in claim 1 above wherein the rationalized second signal is obtained by adding/subtracting an offset constant stored in the transducer mounted memory to the first signal and dividing/multiplying the result by a scaling constant stored in the transducer mounted memory.

9. A pressure sensor conditioning circuit comprising:
an interchangeable, computer connectable pressure transducer sensing a manifolded pressure and including:
a variable frequency oscillator connected to provide an output signal having a frequency varying with the manifolded pressure being sensed,
a resettable, gated counter connected to count cycles of the oscillator output signal when gated by a computer generated gating signal,
a register connected to receive a count $C_{P,T}'$ stored in the counter in response to a computer generated transfer signal,
a read only memory storing a plurality of constants having values determined by the particular characteristics of the transducer, said constants being outputed in response to computer generated address signals, and
means for sensing transducer temperature and providing an analog signal indicative thereof; and
a digital computer operatively connected to reset the counter, generate a gating signal to gate the counter for a predetermined period of time to obtain a count signal $C_{P,T}'$, generate a transfer signal to transfer the count signal from the counter to the register, utilize the count signal stored in the register in making computations, provide address signals to the read only memory and receive output signals indicative of constants stored at addressed locations in response thereto, and receive the analog temperature indicative signal, the digital computer including an analog to digital converter receiving the analog temperature indicative signal, converting said signal to a digital signal $K_T$, the digital computer further including an output register providing a digital output signal $P$ accurately indicating the manifolded pressure, and computing $P$ in accordance with a predetermined mathematical function dependent upon $C_{P,T}'$, $K_T$ and the constants stored in the read only memory.

10. The pressure conditioning circuit as set forth in claim 9 above, wherein the mathematical function for computing P has the form $P = f_0(K_T) + f_1(K_T) f(C_{P,T}) + f_2(K_T) f(C_{P,T})^2$ where $C_{P,T} = (C_{P,T}' + C_C)/Z$, $C_C$ and $Z$ being initial offset and scale constants stored in the read only memory for the purpose of making $C_{P,T}$ a rationalized parameter varying monotonically with pressure and having a predetermined zero point and slope independent of the particular characteristics of the transducer.

11. A pressure sensor conditioning circuit comprising:
a pressure transducer sensing a manifolded pressure and including:
a variable frequency oscillator connected to provide an output signal having a frequency varying with the manifolded pressure being sensed,
a resettable, gated counter connected to count cycles of the oscillator output signal when gated by a gating signal,
a register connected to receive a count $C_{P,T}'$ stored in the counter in response to a transfer signal,
a read only memory storing a plurality of constants having values determined by the particular characteristics of the transducer, said constants being output in response to address signals, and
means for sensing transducer temperature and providing an analog signal indicative thereof; and
a digital computer operatively connected to reset the counter, gate the counter for a predetermined period of time to obtain a count signal $C_{P,T}'$, transfer the count signal from the counter to the register, utilize the count stored in the register for making computations, provide address signals to the read only memory and receive output signals in response thereto, and receive the analog temperature indicative signal, the digital computer including an analog to digital converter receiving the analog temperature indicative signal and converting said signal to a digital signal $K_T$, the digital computer further including an output register providing a digital output signal P accurately indicating the manifolded pressure, and computing P in accordance with the predetermined mathematical function depending upon $C_{P,T}'$, $K_T$ and the constants stored in the read only memory wherein the mathematical function for computing P has the form $P = f_0(K_T) + f_1(K_T) f(C_{P,T}) + f_2(K_T) f(C_{P,T})^2$ where $C_{P,T} = (C_{P,T}' + C_C)/Z$, $C_C$ and Z being initial offset and scale constants stored in the read only memory for the purpose of making $C_{P,T}$ a rationalized parameter varying monotonically with pressure and having a predetermined zero point and slope independent of the particular characteristics of the transducer, and wherein $$f(C_{P,T}) = \sum_{i=0}^{6} a_i(C_{P,T})^i$$

$$f_0(K_T) = \sum_{i=0}^{4} b_i K_T^i$$

$$f_1(K_T) = \sum_{i=0}^{4} c_i K_T^i$$

$$f_2(K_T) = \sum_{i=0}^{4} d_i K_T^i$$

where $a_i$, $b_i$, $c_i$ and $d_i$ are constants stored in the read only memory.

12. An interchangeably connectable pressure transducer for use in a conditioning system having a digital computer operatively connected to the transducer comprising:
a variable frequency oscillator connected to provide an output having a frequency varying with a manifold pressure being sensed;
a gated counter connected to count cycles of the oscillator output in response to gating signals from the computer;
a temperature sensor providing a temperature signal varying with transducer temperature; and
a read only memory storing a plurality of constants having values determined by the particular characteristics of the transducer, the constants and the temperature signal being usable by the computer without change of programming to account for particular characteristics of the transducer to convert a count stored in the counter at the end of a predetermined gating period to a temperature compensated signal varying linearly with the sensed pressure.

13. The method of operating a conditioning circuit including an interchangeable, computer connectable transducer generating a first signal varying over a given range in response to a given range of a sensed physical condition, a transducer mounted memory storing slope and offset constants having predetermined values determined in accordance with particular characteristics of the transducer and a computer connected to communicate with the first signal and transducer mounted memory generating an output signal varying linearly with the sensed physical condition comprising the steps of:
rationalizing the first signal to a predetermined zero point and scale independent of the range of the first signal generated by the particular transducer by using the slope and offset constants stored in the transducer mounted memory to compute a rationalized second signal; and
performing computations on the rationalized second signal within the computer in accordance with a predetermined mathematical function, the result of the computations being a linearized output signal.

14. The method as set forth in claim 13 above, wherein the transducer is a pressure sensor, the computer is a digital computer and the first signal is rationalized by adding the offset constant thereto and dividing the resulting sum by the slope constant.

15. The method of conditioning the output of an oscillator mounted on a transducer and generating a signal varying in frequency with a sensed condition comprising the steps of:
incrementing a counter by a count of one for each cycle of the generated signal for a predetermined period of time, there being an accumulated count stored in the counter at the end of the predetermined period of time; and
rationalizing the accumulated count by adding a predetermined offset constant and dividing the resulting sum by a predetermined slope constant, the result being a rationalized count which varies linearly and monotonically with the frequency of the generated signal.

16. The method as set forth in claim 15 above, further comprising the steps of obtaining a digital signal indicating the temperature of the transducer and computing a temperature compensated, linearized signal indicating the sensed condition in accordance with a predetermined mathematical function dependent upon the rationalized count, the temperature indicating signal and a plurality of constants having predetermined values dependent upon the particular characteristics of the transducer.

17. The method of generating a temperature compensated output signal P varying linearly with a sensed pressure with an interchangeably connectable pressure transducer having a gated counter, an oscillator having an output varying in frequency with sensed pressure connected to the gated counter, a temperature sensor providing an analog temperature signal varying with transducer temperature and a transducer mounted memory storing constants determined in accordance with particular characteristics of the transducer, and a digital computer connected to communicate with the counter, the memory and the temperature signal comprising the steps of gating the oscillator output to the counter for a predetermined period of time to obtain an accumulated count indicative of sensed pressure, rationalizing the accumulated count in accordance with a first predetermined mathematical function containing constants stored in the transducer mounted memory to obtain a rationalized count $C_{P,T}$ varying monotonically with the sensed pressure and having a predetermined zero point and slope with respect to the frequency of the oscillator output, converting the analog temperature signal to a digital temperature signal $K_T$, computing a temperature compensated linearized output signal P in accordance with a second predetermined mathematical function utilizing constants stored in the transducer mounted memory, each of these steps being performed by the digital computer.

18. The method of generating a temperature compensated output signal P varying linearly with a sensed pressure with a pressure transducer having a gated counter, an oscillator having an output varying in frequency with sensed pressure connected to the gated counter, a temperature sensor providing an analog temperature signal varying with transducer temperature and a transducer mounted memory storing constants determined in accordance with particular characteristics of the transducer, and a digital computer connected to communicate with the counter, the memory and the temperature signal comprising the steps of gating the oscillator output to the counter for a predetermined period of time to obtain an accumulated count indicative of sensed pressure, rationalizing the accumulated count in accordance with a first predetermined mathematical function containing constants stored in the transducer mounted memory to obtain a rationalized count $C_{P,T}$ varying monotonically with the sensed pressure and having a predetermined zero point and slope, converting the analog temperature signal to a digital temperature signal $K_T$, computing a temperature compensated linearized output signal P in accordance with a second predetermined mathematical function having the form $$P = \sum_{j=0}^{m} f_j(K_T) f(C_{P,T})^j,$$

where m is a positive integer and $f_j(K_T)$ and $f(C_{P,T})$ are finite power series functions of $K_T$ and $C_{P,T}$ utilizing constants stored in the transducer mounted memory, each of these steps being formed by the digital computer.

19. The method of utilizing a transducer having an oscillator generating a signal varying in frequency over a predetermined range with a sensed condition and a memory storing predetermined constants indicative of the relationship between the frequency of the particular oscillator and the sensed condition mounted thereon, a counter connected to count cycles of the variable frequency signal on command, and a digital computer having a two's complement fractional notation input word operatively connected to the counter and transducer to provide a rationalized digital signal indicative of the sensed condition comprising the steps of:

incrementing the counter by a count of one for each cycle of the variable frequency signal for a predetermined period of time, the capacity of the counter being sufficiently large that no two frequencies within the predetermined range can cause the counter to store the same count at the end of the predetermined period of time and the capacity of the counter being sufficiently small that the counter overflows at least twice during the predetermined period of time;

communicating a count signal stored in the counter at the end of the predetermined period of time to the digital computer with the most significant bit of the count signal aligned with the sign bit of the input word of the digital computer, the numbering of bits in the count signal being no greater than the number of bits in the input word (including the sign bit) of the computer;

adding a first constant stored in the memory to the count signal to obtain an offset compensated signal, the first constant having a predetermined value selected to make the offset compensated signal equal to zero when the variable frequency oscillator signal is at a frequency at the center of the predetermined range, the offset compensated signal varying monotonically with oscillator frequency over the predetermined range; and dividing the offset compensated signal by a second constant stored in the memory to obtain a rationalized signal, the second constant having a predetermined value selected to cause the rationalized signal to vary substantially over the full scale capability of the computer as the oscillator frequency varies over the predetermined range.

* * * * *

UNITED STATES PATENT OFFICE
CERTIFICATE OF CORRECTION

Patent No. 3,790,910    Dated February 5, 1974

Inventor(s) William H. McCormack

It is certified that error appears in the above-identified patent and that said Letters Patent are hereby corrected as shown below:

Column 4, line 4, for "porportional" read --proportional--; line 8, after "word" for "X" read --$\underline{X}$--; line 9, the equation should read:

$$\underline{X} = 2^{19}$$

Column 4, line 11, the equation should read:

$$P_{10} = \frac{(36.0)(\underline{X})}{2^{19}}$$

Column 5, lines 61 and 62, for:

| Frequency | Counter State | Fractional Notation Decimal Equivalent | read:

| Frequency | Counter State | Fractional Notation Decimal Equivalent |

Column 7, line 33, for "signal, the scale constant" read --signal and the scale and--; line 34, for "and the offset constant" read --offset constants--. Column 12, line 38, for "numbering" read --number--.

Signed and sealed this 3rd day of December 1974.

(SEAL)
Attest:

McCOY M. GIBSON JR.
Attesting Officer

C. MARSHALL DANN
Commissioner of Patents